Aug. 28, 1945. J. ROSNER 2,383,619
INSTRUMENT FOR GRINDING AND POLISHING DIAMONDS
Filed Nov. 24, 1943 2 Sheets-Sheet 1
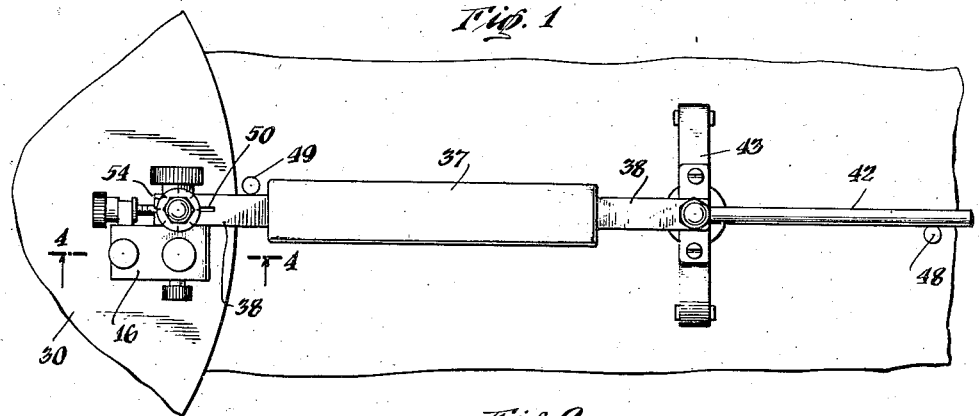
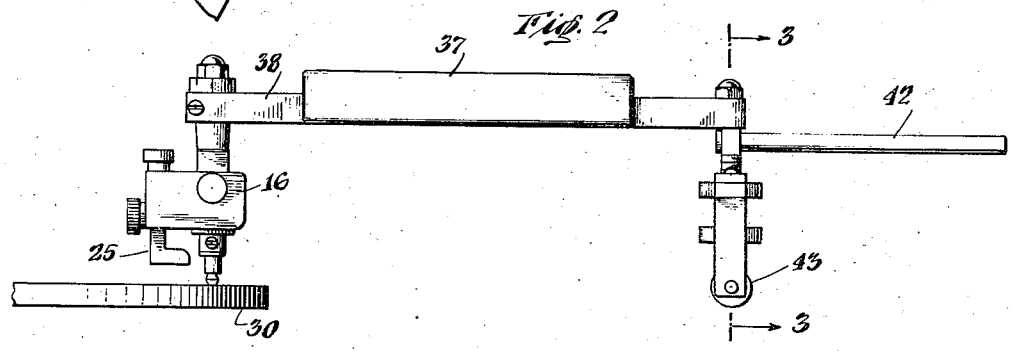
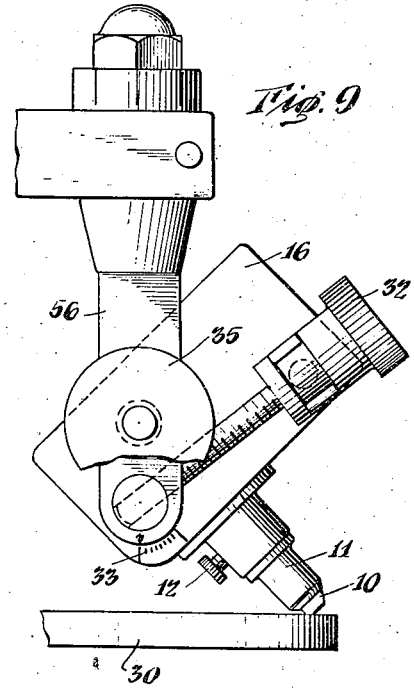
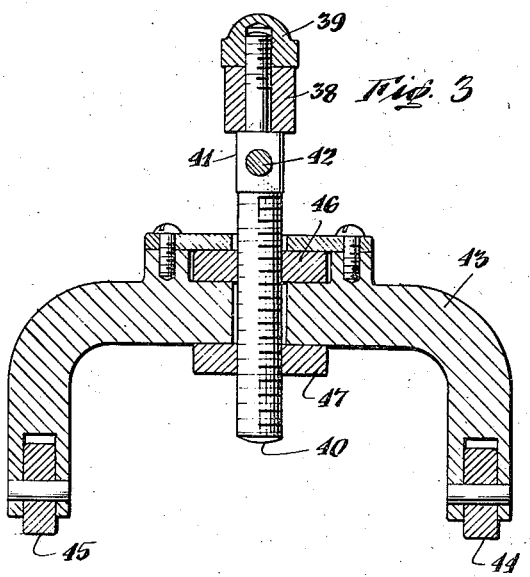
INVENTOR.
Juda Rosner
BY
ATTORNEY

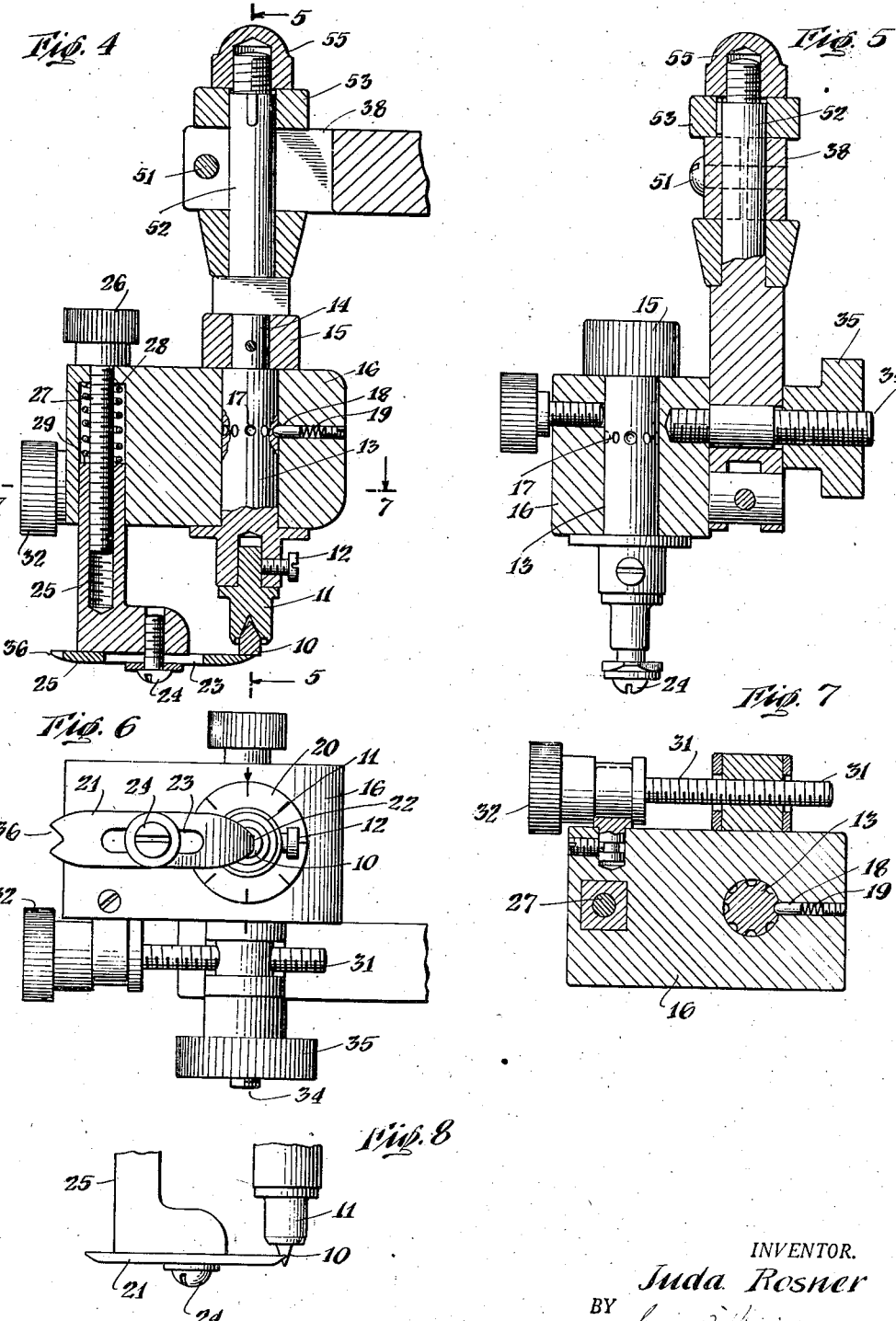

Patented Aug. 28, 1945

2,383,619

UNITED STATES PATENT OFFICE 2,383,619

INSTRUMENT FOR GRINDING AND POLISHING DIAMONDS

Juda Rosner, Brooklyn, N. Y.

Application November 24, 1943, Serial No. 511,612

1 Claim. (Cl. 51—229)

My invention relates to improvements in devices for holding diamonds and other precious stones while they are ground and polished, and particularly to a new and useful instrument adapted to be held by the operator above a rotating grinding table at any desired and required angle in order to subject the stone to various polishing and grinding operations by raising and lowering the instrument at any desired angle against the rotating table.

According to my invention, the diamond or other precious stone is held in a cup by means of a special incandescent or heat-proof paste, baked therein and held during this operation in the cup by means of a special finger having a blunt end engaging the stone during the setting of the paste.

The instrument is provided with a plurality of indicators or dials as for instance a means for indicating the position of the stone relatively to the face of the polishing disc as the grain of the stone requires, automatically, thus doing away with the necessity of frequent trials.

It will therefore with the instrument according to my invention not be necessary to remove the stone from the instrument until all operations are finished all around.

Another indicator on the holder according to my invention discloses the number of rotations of the stone necessary to bring it into its proper position by an audible click produced by the engagement of a spring controlled pin in suitable holes in any required number arranged in the stone carrying spindle.

Still another indicator or scale on the tool indicates the angular position of the tool during the successive grinding of the various facets.

The instrument can also conveniently be used in polishing the flat upper face of the stone and the adjoining angular, upper portions of the facets.

It is furthermore an object of my invention to provide the instrument with a suitable handle, one end of which is mounted on a carriage provided with means for raising and lowering this end of the handle until the same is entirely level as indicated by a suitably arranged level or gage whereupon the same is locked in its adjusted position.

It is the main object of my invention to provide an instrument of this character which works perfectly automatically and with precision during the various steps of polishing and grinding stones so as to save time and labor lost by the necessity of making various tentative adjustments.

These and other objects and advantages of my invention will become more fully known as the description thereof proceeds, and will then be specifically defined in the appended claim.

In the accompanying drawings forming a material part of this disclosure:

Fig. 1 is a top plan view of an instrument constructed according to my invention.

Fig. 2 is a side elevation thereof.

Fig. 3 is a section on line 3—3 of Fig. 2.

Fig. 4 is a sectional elevation of the diamond holder, the section being taken on line 4—4 of Fig. 1.

Fig. 5 is a section on line 5—5 of Fig. 4.

Fig. 6 is a bottom plan view of the lower part of Fig. 4.

Fig. 7 is a section on line 7—7 of Fig. 4.

Fig. 8 is a detail view illustrating the notch of the finger in engagement with a facet.

Fig. 9 is a side elevation showing the instrument in an inclined position to the table.

As illustrated, the diamond 10 is pasted and held in a cup 11, securely held by means of a set screw 12 in the open end of a substantially vertical spindle 13 or the like having a reduced upper end 14 carrying a knurled knob 15. The spindle 13 has in its circumference within the block 16, preferably eight holes 17 into which engages successively and laterally a pin 18 controlled by a spring 19, so that when the spindle 13 is turned, by the knob 15, an audible click is heard. The block 16 carries a scale or dial 20 corresponding with its graduations to the eight holes 17 in spindle 13. A finger 21 has a blunt end 22 engaging therewith and holding the stone in its cup 11 during setting of the paste. This finger has an intermediate slot 23 in which is displaceably arranged a screw 24. By loosening the screw 24, the finger 21 can be turned so as to allow the use of both of its ends. The finger 21 is held by means of this adjustable screw 24 at the lower end of a holder 25, which can be raised or lowered by the knurled knob 26 at the outer end of a screw spindle 27 about which a spring 28 is wound within a chamber 29 in the holder 25. In order to adjust the diamond or stone on the instrument at an angle to the grinding table 30, an adjusting screw 31 is provided which can be operated by means of a knurled knob 32 and which can be turned in any of its adjusted angles against the table, indicated on dial 33, if a nut 35 is loosened to allow an adjustment about the axis of shaft 13 when the same is loosened which normally locks an element 56 of the instrument against movement relatively to block 16. The finger 21 has at its end opposite to the blunt end 22, a notch 36 to engage the facet edges at the lower end of the stone, as illustrated in Fig. 8.

The handle 37 of the instrument has its shaft 38 secured by means of a cap nut 39 to the upper end of a screw 40 having two flattened side faces and carrying a boss 41 in which a rod 42 is held. The screw 40 passes through a carriage 43 on wheels 44, 45 and can be adjusted in vertical direction by the proper operation of an adjusting nut 46 to be locked in its adjusted position by means of the nut 47.

Stop pins 48 and 49 on the work bench serve to limit the lateral movements of the rod 42.

The inner end of the handle shaft 38 is split, as at 50, and a set screw 51 connects both parts about a spindle 52 carrying a nut 53, graduated as shown at 54, in order to indicate tests of the position of the stone with respect to the grain of the stone to be worked upon. The nut is locked in its adjusted position by means of the cap nut 55 on spindle 52.

In operation, if grinding of the flat face of the stone and of the angular faces adjoining the flat face, is desired, the finger 21 is removed, and the stone is pressed by means of the instrument handle against the grinding table. First test by turning the dial nut 53 is made to turn the instrument without disturbing its prior adjustments in order to ascertain whether the stone is presented to the face of the polishing disc as the grain of the stone requires. Then the proper adjustments of the angles in which the instrument is to be held against the table are made in order to properly grind the facets.

It will be understood that I have described and shown the preferred form of my instrument only as one example of the many possible ways to practically construct the same, and that I may make such changes in the general arrangement and in the construction of the minor details of the invention as come within the scope of the appended claims without departure from the spirit of my invention and the principles involved.

Having thus described my invention, what I claim as new, and desire to secure by Letters Patent is:

In an instrument for grinding and polishing diamonds, a carriage, a block mounted on one end of said carriage, a holder having a cup-shaped end for retaining a cemented diamond mounted on said block, a finger for holding the diamond in said cup during drying of the cement and during grinding, said finger having a blunt end to hold the diamond during the drying operation and a notched end for engagement with the facets of the diamond during the grinding operation and said finger also having a longitudinally slotted central portion between the blunt and notched ends, a screw threaded into said block and extending through the slotted portion of said finger whereby said finger is adjustable to engage the diamond with either the blunt or notched end.

JUDA ROSNER.